United States Patent [19]

Harada et al.

[11] Patent Number: 4,840,814

[45] Date of Patent: Jun. 20, 1989

[54] PROCESS FOR MAKING A CALCIUM ENRICHED MILK

[75] Inventors: Hidetoshi Harada, Sanitama; Satoshi Chihara, Tokyo; Yutaka Suginaka, Saitama; Shigeko Suido, Tachikawa; Toshitaka Kobayashi, Saitama, all of Japan

[73] Assignee: Meiji Milk Products Company Limited, Tokyo, Japan

[21] Appl. No.: 78,016

[22] Filed: Jun. 20, 1987

Related U.S. Application Data

[63] Continuation of Ser. No. 746,784, Jun. 20, 1985, abandoned.

[30] Foreign Application Priority Data

Jul. 3, 1984 [JP] Japan ................................. 59-136495

[51] Int. Cl.$^4$ ............................................. A23C 3/00
[52] U.S. Cl. ...................................... 426/580; 426/74
[58] Field of Search ................ 426/74, 580, 522, 801, 426/800

[56] References Cited

U.S. PATENT DOCUMENTS 2,541,568  2/1951  Bauer ................................. 426/74
2,659,676  11/1953  Howard et al. ..................... 426/74
2,871,123  1/1959  Bauer et al. ........................ 426/74
4,216,236  8/1980  Mueller et al. ..................... 426/74

FOREIGN PATENT DOCUMENTS 100480  9/1976  Japan ................................. 426/580
186445  11/1982  Japan ................................. 426/580
1101214  7/1984  U.S.S.R. ............................. 426/580

OTHER PUBLICATIONS

Watt and Merrill, 1975, Composition of Foods, U.S.-D.A., Handbook No. 8, pp. 38–39.

Primary Examiner—Donald E. Czaja
Assistant Examiner—Carolyn Paden
Attorney, Agent, or Firm—Browdy and Niemark

[57] ABSTRACT

Calcium enriched milk or toned milk prepared by adding a water soluble calcium salt of an organic acid to thermally sterilized milk or toned milk, and adjusting the pH value of the obtained mixture to 6.6 or above is disclosed.

Calcium enriched milk or toned milk which forms no precipitate can be successfully prepared by adding a water-soluble calcium salt of an organic acid to milk or toned milk which is previously sterilized by heating and adjusting the pH value of the mixture to 6.6 or above.

6 Claims, No Drawings

PROCESS FOR MAKING A CALCIUM ENRICHED MILK

This application is a continuation of application Ser. No. 746,784, filed June 20, 1985 abandoned.

BACKGROUND OF THE INVENTION

1. Field of the Invention

This invention relates to the enrichment of milk or toned milk with calcium.

More particularly, it relates to calcium enriched milk or toned milk which shows no precipitate nor coagulum of milk protein upon heating and a method for manufacturing the same.

Milk generally contains approximately 100 mg % of calcium so that milk or various milk drinks may be taken as a calcium source.

However a demand for calcium has been increasing so that it is presently required to enrich milk or toned milk with calcium.

2. Description of the Prior Art

As a typical calcium enricher, finely divided calcium carbonate has been frequently employed. However it would precipitate upon prolonged storage so that it can be hardly used in enriching milk or similar products.

Japanese Patent Laid-Open No. 110167/1982 has disclosed a process for stabilizing a mixture of an edible oil and calcium carbonate with an emulsifier. Japanese Patent Publication No. 35945/1982 has disclosed a process for the retention of calcium carbonate in microcrystalline cellulose. However either of these methods gives an insufficient stability so that it is impossible to introduce a large amount of calcium thereby.

SUMMARY OF THE INVENTION

We have tried to develop a method for enriching milk or toned milk with calcium in a stable state and succeeded in manufacturing calcium enriched milk containing at least 30 mg % of additional calcium to thereby complete the present invention.

Accordingly the present invention provides calcium enriched drink which is manufactured by adding a water soluble calcium salt of an organic acid to thermally sterilized milk or toned milk and adjusting the pH value of the obtained mixture to 6.6 or above.

The present invention further provides a method for manufacturing a calcium enriched drink which comprises sterilizing milk or toned milk by heating and adding an alkaline agent and a water-soluble calcium salt of an organic acid thereto, thus adjusting the pH value of the obtained mixture to 6.6 or above.

DETAILED DESCRIPTION OF THE INVENTION

The calcium compound used in the present invention is preferably a water-soluble calcium salt of an organic acid; although a water-soluble inorganic calcium salt is available too. Examples of the water-soluble calcium salt of an organic acid are calcium lactate, calcium gluconate and calcium malate, while those of the inorganic calcium salt are calcium chloride and calcium hydroxide.

Calcium salts of organic acids are generally soluble in water. However when a large amount thereof is simply added to milk, the resulting milk would scorch and stick to the heating plate of a thermal sterilizer, thus making the subsequent fluid sterilization impossible. It would further bring about coagulation of the milk during sterilization and cause feathering (microcoagulums of protein) when added to coffee. Therefore it is difficult to employ these salts in practice.

In the present invention, an alkaline agent and a water soluble calcium salt of an organic acid are added to thermally sterilized milk or toned milk to give a final pH value of 6.6 or above to thereby prevent coagulation or feathering upon reheating at use.

In the present invention milk or toned milk such as reconstituted milk, modified milk, enriched milk and other milk drinks is enriched with calcium.

In the method of the present invention, milk or toned milk is first sterilized by heating. Ordinarily milk or toned milk is sterilized at the final step of the production process, i.e. after adding various submaterials. On the other hand, the sterilization is performed prior to the addition of a calcium compound and the adjustment of the pH value in the method of the present invention. Ultra-high temperature sterilization, e.g. at 130° C., after the addition of a water-soluble calcium salt of an organic acid is undesirable since it may result in heat coagulation of milk protein in the treated milk caused by the calcium compound and high temperature as well as scorching and sticking of the milk protein to the heating plate of the sterilizer.

To the thermally sterilized milk or toned milk, an alkaline agent and a calcium salt of an organic acid are added to give a pH value of the product of 6.6 or above. The alkaline agent may be added thereto either before, after or at the same time with the addition of the calcium salt. Since an appropriate amount of the alkaline agent depends on the type and amount of the calcium salt, it is preferable to carry out a preliminary addition test to thereby determine the quantative ratio of these compounds. The range of the pH value of the product giving an excellent stability against coagulation is from 6.6 to 7.9, preferably from 6.7 to 7.7. When the pH value of the product is below 6.6, the product would be liable to form coagulums upon reheating at use. On the other hand, when the pH value of the product exceeds 8.0, an undesirable lowering of the flavor would be observed.

Examples of preferable alkaline agents are NaOH, KOH, $Na_2CO_3$, $K_2CO_3$, $NaHCO_3$ or combinations thereof. It is desirable to use 1 to 5% aqueous solution of an alkaline agent.

A water-soluble calcium salt of an organic acid such as calcium lactate, calcium gluconate or calcium malate is further added to the milk or toned milk. It is desirable to use a 5 to 15% aqueous solution thereof wherein said calcium salt is completely dissolved, e.g. by heating.

The water-soluble calcium salt of an organic acid is added to give a calcium (in terms of net Ca) concentration of 30 to 90 mg %, effectively 40 to 80 mg %. Enriching calcium concentration by 20 mg % or below could bring about little enriching effect. On the other hand, enriching calcium concentration by more than 90 mg % would prevent coagulation upon heating but result in the lowering of the flavor of the product because of the excessive amount of the alkaline agent and the calcium salt.

The milk or toned milk thus obtained is enriched by 30 to 90 mg% calcium (in terms of Ca) and shows no precipitate. It exhibits an excellent flavor without forming any coagulums upon reheating at use nor feathering when added to coffee. It also shows no precipitate of coagulums upon prolonged storage.

To further illustrate the present invention, the following Examples and Comparative Examples will be given.

EXAMPLE 1

1000 kg of reconstituted milk containing 10.1% of SNF(Solid Not Fat), 2.05% of milk fat and 135 mg % of Ca and adjusted to a pH value of 6.75 was sterilized with a UHT plate sterilizer at 130° C. for two sec and an alkaline solution was added thereto to give a pH value of 6.95.

The alkaline solution as used above was a 4% aqueous solution of sodium hydroxide. 3 kg thereof was required for adjusting the pH value.

Subsequently 44.5 kg in total of a 10% aqueous solution of calcium gluconate as a calcium enricher was proportionally added thereto.

The resulting calcium enriched milk stored in a tank contained 9.63% of SNF, 1.95% of milk fat and 165 mg % in terms of Ca. The pH value thereof was 6.80.

The calcium enriched milk thus obtained was packed into a conventional paper container of 1000 ml in volume and allowed to stand in a refrigerator at 5° C. for two weeks. Consequently trace precipitates were observed therein and the flavor thereof was normal. It exhibited an excellent thermal stability without forming any coagulums when boiled in a household pan for one min.

Further when an appropriate amount thereof was added to conventional hot coffee, no feathering was observed.

COMPARATIVE EXAMPLE 1

The same materials as used in Example 1 were employed. Prior to the sterilization, the same amounts as described in Example 1 of the alkaline agent and the water soluble calcium salt were added to the reconstituted milk and mixed therewith. The obtained mixture was sterilized by heating at 130° C. for two sec. As a result, the treated milk scorched and sticked to the heating plate of the sterilizer and coagulums were observed therein.

EXAMPLE 2

1000 kg of raw milk containing 8.3% of SNF, 3.4% of milk fat and 110 mg % of net Ca at a pH value of 6.85 at 10° C. was sterilized with a UHT plate sterilizer at 130° C. for two sec and an alkaline solution for adjusting the pH value was proportionally added thereto with a static mixer provided midway in the piping to thereby give a pH value of 7.55 at the outlet.

The alkaline solution as used above was prepared by mixing equal amounts of a 3.36% solution of calcium carbonate and a 4.18% solution of potassium carbonate, and the mixture was germfree filtrated through a sterilizing filter. 26 kg of the alkaline solution was consumed by the completion of the passage of 1000 kg of the raw milk as described above.

The outlet of the abovementioned mixer was connected to another static mixer through a pipe into which 24 kg of a 20% aqueous solution of calcium lactate was proportionally injected. The 20% solution of calcium lactate was dissolved in hot water (90° C.) and added after filtering through a sterilizing filter previously adjusted to approximately 60° C. After adjusting the pH value and adding the calcium lactate, the milk was stored in a conventional cylindrical tank and cooled to 5° C. This milk contained 7.90% of SNF, 3.20% of milk fat and 160 mg % of Ca. The pH value thereof was 7.05.

The calcium enriched milk thus obtained was packed in a conventional paper container of 1000 ml in volume and allowed to stand in a refrigerator at 5° C. for two weeks. As a result trace precipitates were observed and the flavor thereof was normal. It exhibited an excellent thermal stability without forming any coagulums when boiled in a household pan for one min.

When an appropriate amount thereof was added to conventional hot coffee, no feathering was observed.

EXAMPLE 3

1000 kg of reconstituted milk containing 10.1% of SNF, 2.05% of milk fat and 135 mg % of Ca and adjusted to a pH value of 6.75 was sterilized in the same manner as described in Example 1 and a mixture of equal amounts of a 3.36% solution of sodium carbonate and a 4.18% solution of potassium carbonate was added thereto.

In order to adjust to the aimed pH value (8.80), 68 kg of the alkaline agent was proportionally added thereto.

Subsequently 40 kg of a 20% solution of calcium lactate as an enricher was flow-proportionally added thereto.

The resulting calcium enriched reconstituted milk stored in a tank contained 9.10% of SNF, 1.84% of milk fat and 210 mg % of Ca. The pH value thereof was 7.70.

The product obtained in Example 3 was tested to obtain the following results.

1. After stored in a refrigerator at 5° C. for two weeks, the product showed a trace amount of precipitations and a normal flavor although some panelers noted an undesirable taste.

2. When boiled in a pan for one min, the product formed no coagulum and exhibited an excellent thermal stability.

3. The product showed no feathering when added to coffee.

COMPARATIVE EXAMPLE 2

The same materials as used in Example 3 were employed. The aimed pH value when the alkaline agent was added was set to 9.15 and 83 kg per 1000 kg of the reconstituted milk of the alkaline aqueous solution was added. 48 kg of a 20% solution of calcium lactate was further added thereto. After the completion of the addition followed by mixing, the pH value of the obtained toned milk was 8.0.

The reconstituted milk was then treated in the same manner as described in Example 3. The product thus obtained exhibited an excellent stability when boiled in a pan but suffered from lowering of the flavor, that is, it remarkably exhibited an undesirable and astringent taste.

What is claimed is:

1. A process for producing a calcium enriched milk or toned milk which does not coagulate upon boiling, comprising the steps of upwardly adjusting the pH of said milk or toned milk to above 6.7, adding calcium to said milk or toned milk in the form of a water-soluble calcium salt of an organic acid, and then lowering the pH of said milk or toned milk, wherein:

all upward adjustment of said pH is accomplished exclusively by adding an alkali metal hydroxide, carbonate or bicarbonate to said milk or toned milk;

all lowering of said pH of said milk or toned milk is accomplished exclusively by said addition of said calcium salt after said upward adjustment;

said calcium salt is added in an amount of 30–90 mg% and lowers said pH of said milk or toned milk to a value above that of said milk or toned milk prior to said upward adjustment and within a range of 6.6–7.9; and said milk or toned milk is sterilized and cooled prior to the upwardly adjustment of the pH; and wherein the amount of said alkali metal hydroxide carbonate or bicarbonate is such that the calcium enriched milk or toned milk does not coagulate upon a one minute boiling.

2. The process of claim 1, wherein said sterilization is performed at about 130° C.

3. The process of claim 2, wherein said calcium salt of an organic acid is calcium lactate or calcium gluconate.

4. A process for producing a calcium enriched milk or toned milk according to claim 1, wherein the alkali agent is a least one selected from the group consisting of NaOH, KOH, $K_2CO_3Na_2CO_3$, and $NaHCO_3$.

5. A method for manufacturing calcium enriched milk or toned milk in accordance with claim 4, wherein the pH value of the product is from 6.7 to 7.7.

6. A process for producing a calcium enriched milk or toned milk accoding to claim 1, wherein the water-soluble calcium salt of an organic acid is at least one selected from the group consisting of calcium lactate, calcium gluconate, and calcium malate.

* * * * *